(12) United States Patent
Kawaguchi

(10) Patent No.: US 7,435,008 B2
(45) Date of Patent: Oct. 14, 2008

(54) VEHICLE PINION SHAFT SUPPORT SYSTEM

(75) Inventor: Toshihiro Kawaguchi, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 263 days.

(21) Appl. No.: 11/312,422

(22) Filed: Dec. 21, 2005

(65) Prior Publication Data

US 2006/0133710 A1    Jun. 22, 2006

(30) Foreign Application Priority Data

Dec. 22, 2004  (JP)  ............................ P2004-371275

(51) Int. Cl.
F16C 33/58  (2006.01)
F16C 33/62  (2006.01)
F16C 19/00  (2006.01)

(52) U.S. Cl. ...................................... 384/571; 384/450

(58) Field of Classification Search ................ 384/450, 384/548, 490–492, 564–569, 625, 571; 428/217, 428/698; 148/319, 906
See application file for complete search history.

(56) References Cited

U.S. PATENT DOCUMENTS

| | | | | |
|---|---|---|---|---|
| 5,567,508 A | * | 10/1996 | Murakami ................... | 384/548 |
| 6,086,261 A | * | 7/2000 | Nakagawa et al. ........... | 384/571 |
| 6,086,262 A | * | 7/2000 | Matsumoto .................. | 384/571 |
| 6,379,049 B1 | * | 4/2002 | Shibazaki et al. ........... | 384/450 |
| 6,423,158 B1 | | 7/2002 | Maeda et al. | |
| 6,440,233 B2 | * | 8/2002 | Okita et al. .................. | 148/319 |
| 6,447,168 B2 | * | 9/2002 | Tsujimoto et al. ........... | 384/450 |
| 6,464,398 B2 | * | 10/2002 | Takehara et al. ............. | 384/450 |
| 6,547,443 B2 | * | 4/2003 | Hanai et al. ................. | 384/571 |
| 6,893,372 B2 | * | 5/2005 | Matsuyama et al. ......... | 384/450 |
| 2002/0051594 A1 | * | 5/2002 | Takehara et al. ............. | 384/450 |
| 2002/0102041 A1 | | 8/2002 | Matsuyama et al. | |
| 2004/0047528 A1 | | 3/2004 | Tsujimoto et al. | |

FOREIGN PATENT DOCUMENTS

| | | |
|---|---|---|
| EP | 0 861 907 A2 | 9/1998 |
| EP | 1 099 869 A2 | 5/2001 |
| EP | 1 312 694 A2 | 5/2003 |
| JP | 60-092463 | 5/1985 |
| JP | 05-075520 | 10/1993 |

(Continued)

*Primary Examiner*—Marcus Charles
(74) *Attorney, Agent, or Firm*—McGinn IP Law Group, PLLC

(57) ABSTRACT

There are provided tapered roller bearings which support a pinion shaft. Inner races have large rib faces each having a recessed surface shape on which large-diameter end faces of tapered rollers slide. The surface roughness of the large-diameter end face is $\sigma 1$ [µmRa] is 0.025 or more. In addition, assuming the surface roughness of the large rib face is $\sigma 2$ [µmRa], $(\sigma 1^2 + \sigma 2^2)^{1/2}$ is 0.17 [µmRa] or less. The sliding portion of the large-diameter end face and the sliding portion of the large rib face are made of a carburized steel, and the carbon content in a matrix phase in a surface layer portion of each of the sliding portions to a depth of 50 µm from a surface is 0.8 wt % or more, the surface hardness thereof is in the range of Rockwell C63 to 67, and a surface retained austenite amount is set to be 20% or more and 25% or less.

20 Claims, 3 Drawing Sheets

FOREIGN PATENT DOCUMENTS

| | | |
|---|---|---|
| JP | 08-247260 | 9/1996 |
| JP | 2000-160253 | 6/2000 |
| JP | 2001-107952 | 4/2001 |
| JP | 2001-200851 | 7/2001 |
| JP | 2002-122146 | 4/2002 |
| JP | 2002-221223 | 8/2002 |

* cited by examiner

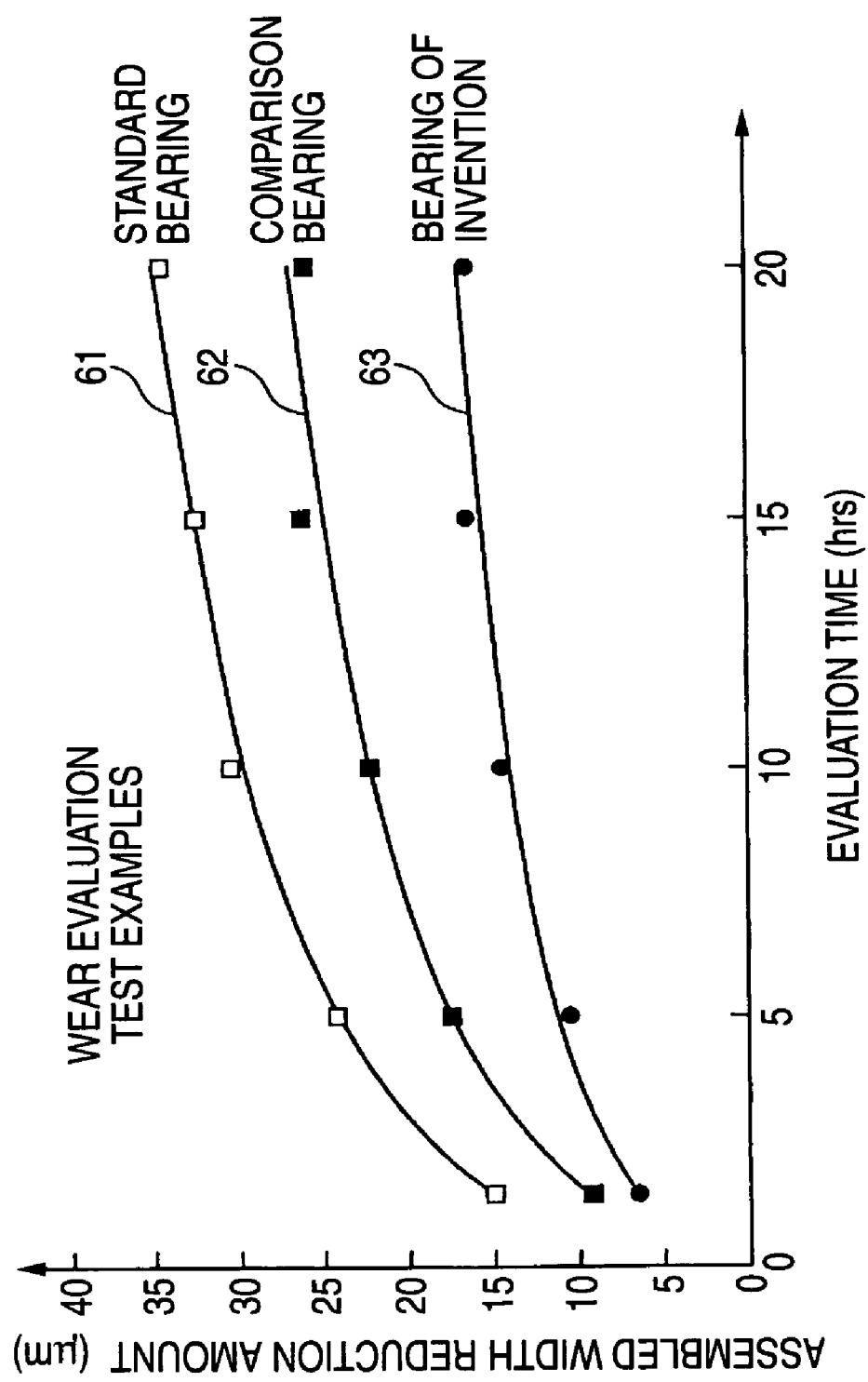

VEHICLE PINION SHAFT SUPPORT SYSTEM

BACKGROUND OF THE INVENTION

The present invention relates to a vehicle pinion shaft support system (pinion shaft supporting device for vehicle or automobile) and more particularly to, for example, a vehicle pinion shaft support system such as used at a differential (differential gear, differential deice etc.) and a transaxle (differential transaxle, transaxle device, transaxle apparatus etc.).

As a conventional vehicle pinion shaft support system, there exists a vehicle pinion shaft support system such as described in JP-A-8-247260 (Patent Document No. 1).

The vehicle pinion shaft support system includes a pinion shaft, two tapered roller bearings which are provided on the pinion shaft in such a manner as to be spaced apart from each other at a predetermined interval and a pinion ring which meshes with the pinion shaft.

Each of the two tapered roller bearings has an inner race, an outer race and tapered rollers disposed between the inner race and the outer race. The inner race has a large rib face (back face rib) on which large-diameter end faces of the tapered rollers slide. A predetermined initial pre-load is applied to each of the two tapered roller bearings in radial and axial directions of the vehicle pinion shaft support system so that the support rigidity of the pinion shaft becomes a predetermined value or more.

In the conventional vehicle pinion shaft support system, however, in the event that the initial pre-load value is set high with a view to increasing the support rigidity of the pinion shaft, a torque needed to drive the two tapered roller bearings is increased, leading to a problem that the running costs of the vehicle pinion shaft support system are, in turn, increased.

On the other hand, in the event that the initial pre-load is set to a proper value or a value that is lower than the proper value, the value of the pre-load is decreased by a wear generated mainly between the large-diameter end faces of the tapered rollers and the large rib face of the inner races whereby the support rigidity of the pinion shaft by the tapered rollers becomes lower than a predetermined value, leading to a problem that vibration and looseness are generated between the pinion shaft and the tapered rollers.

Patent Document No. 1: JP-A-8-247260

SUMMARY OF THE INVENTION

Then, a problem that the invention is to solve is to provide a vehicle pinion shaft support system which needs only a small torque to drive the tapered roller bearings and generates neither vibration nor looseness between the pinion shaft and the tapered rollers.

With a view to solving the problem, according to a first aspect of the invention, there is provided a vehicle pinion shaft support system comprising:

a pinion shaft; and a tapered roller bearing which supports the pinion shaft and has an inner race, an outer race and tapered rollers, wherein the inner race has a large rib face having a recessed surface shape (concave portion) on which large-diameter end faces of the tapered rollers slide, and when assuming that the surface roughness of the large-diameter end faces is $\sigma 1$ [μmRa] and the surface roughness of the large rib face is $\sigma 2$ [μmRa], $\sigma 1$ is 0.025 or more and $(\sigma 1^2 + \sigma 2^2)^{1/2}$ is 0.17 [μmRa] or less, wherein a sliding portion of the large-diameter end face of the tapered roller which slides on the large rib face and a sliding portion of the large rib face of the inner race on which the large diameter end race of the tapered roller slides are made of carburized steel, wherein a carbon content in a matrix phase in a surface layer portion of each of the sliding portions to a depth of 50 μm from a surface thereof is 0.8 wt % or more, wherein the surface hardness thereof is in the range of Rockwell C63 to 67, and wherein a surface retained austenite amount is 20% or more and 25% or less.

According to the first aspect of the invention, since the inner race has the large rib face having the recessed surface shape on which the large-diameter end faces of the tapered rollers slide and when assuming that the surface roughness of the large-diameter end faces is $\sigma 1$ [μmRa] and the surface roughness of the large rib face is $\sigma 2$ [μmRa], $\sigma 1$ is 0.025 or more and $(\sigma 1^2 + \sigma 2_2)^{1/2}$ is 0.17 [μmRa] or less, the formation of an oil film between the large-diameter end faces and the large collar portion is facilitated. Consequently, the value of the torque needed to drive the tapered roller bearings can be reduced largely, thereby making it possible to reduce remarkably the running costs of the vehicle pinion shaft support system.

Preferably, the following conditions is preferably satisfied:

$\sigma 1 \geq 0.04$ μm;

$\sigma 1 \leq 0.10$ μm; and $(\sigma 1^2 + \sigma 2^2)^{1/2} < 0.12$ μm.

More preferably, the following conditions is satisfied:

$\sigma 1 \geq 0.06$ μm;

$\sigma 1 \leq 0.08$ μm; and $(\sigma 1^2 + \sigma 2^2)^{1/2} < 0.10$ μm.

In addition, according to the aspect of the invention, since the sliding portion of the large-diameter end face of the tapered roller which slides on the large rib face and the sliding portion of the large rib face of the inner race on which the large diameter end face of the tapered roller slides are made of carburized steel, the carbon content in the matrix phase in the surface layer portion of each of the sliding portions to the depth of 50 μm from the surface thereof is 0.8 wt % or more, the surface hardness thereof is in the range of Rockwell C 63 to 67, and the surface retained austenite amount is 20% or more and 25% or less, the wear of the sliding portion of the large-diameter end face and the sliding portion of the large rib face can be reduced remarkably.

Preferably, the carbon content is 1.0 wt % or more, the surface hardness thereof is in the range of Rockwell C 64 to 66, and the surface retained austenite amount is 21% or more and 24& or less.

Consequently, in the invention, an oil film can be formed between the two sliding portions, and at the same time, the wear of the two sliding portions can be reduced remarkably, whereby an amount of wear generated between the two sliding portions can be reduced remarkably compared to the conventional system. In addition, the reduction amount of the assembled width of the vehicle pinion shaft support system can be reduced largely down to on the order of 50% of that of the conventional system compared thereto.

Consequently, according to the first aspect of the invention, being different from the conventional system, since the pre-load to be applied to the tapered roller bearings at the initial setting of the vehicle pinion shaft support system can be set to a pre-load which realizes an appropriate support rigidity from the beginning, the torque in particular at the initial stage of an operation can be reduced, thereby making it possible to reduce the running costs of the vehicle pinion shaft support system. In addition, the support rigidity of the pinion shaft by the tapered roller bearings can also be maintained at a desirable value over long period of time, whereby the generation of vibration and looseness between the tapered roller bearings and the pinion shaft can be prevented, thereby making it possible to extend the life of the vehicle pinion shaft support system largely.

According to a second aspect of the invention, there is provided a vehicle pinion shaft support system comprising:

a pinion shaft; and a tapered roller bearing which supports the pinion shaft and has an inner race, an outer race and tapered rollers, wherein the inner race has a large rib face having a recessed surface shape on which large-diameter end faces of the tapered rollers slide, and when assuming that the surface roughness of the large-diameter end faces is $\sigma1$ [μmRa] and the surface roughness of the large rib face is $\sigma2$ [μmRa], $\sigma1$ is 0.025 or more and $(\sigma1^2+\sigma2^2)^{1/2}$ is 0.17 [μmRa] or less, wherein a sliding portion of the large-diameter end face of the tapered roller which slides on the large rib face and a sliding portion of the large rib face of the inner race on which the large diameter end face of the tapered roller slides are made by applying a heat treatment including a carburizing treatment to a steel material including 0.15 to 0.3 wt % carbon, wherein in a portion of each of the sliding portions to a depth of 50 μm from a topmost surface thereof as a base, the carbon content is in the range of 1.0 to 1.5 wt %, the Rockwell hardness in scale C is in the range of 64 to 66, the compression retained stress is in the range of 150 to 2000 Mpa, the maximum carbide diameter is 3 μm or less and the carbide area ratio is in the range of 10 to 25%, and wherein in a portion of each of the sliding portions to a depth of 50 to a/5 μm when assuming that an effective hardened layer dept is a [μm], the carbon content is in the range of 0.75 to 1.3 wt %, the compression retained stress is in the range of 150 to 1000 MPa, the retained austenite amount is in the range of 25 to 45%, the maximum carbide diameter is 1 μm or less and the carbide area ratio is 15% or less.

The effective hardened layer depth is an effective hardened layer depth regulated under JIS G 0559.

Preferably, the following conditions is preferably satisfied:

$\sigma1 \geq 0.04$μm;

$\sigma1 \leq 0.10$μm;

$\sigma1^2+\sigma2^2)^{1/2} < 0.12$μm;

in a portion of each of the sliding portions to the depth of 50 μm from a topmost surface thereof as a base, the carbon content is in the range of 1.15 to 1.4 wt %, the Rockwell hardness in scale C is in the range of 64.5 to 65.5, the compression retained stress is in the range of 800 to 1200 Mpa, the maximum carbide diameter is 2 μm or less and the carbide area ratio is in the range of 15 to 20%; and in a portion of each of the sliding portions to a depth of 50 to a/5 μm when assuming that an effective hardened layer dept is a [μm], the carbon content is in the range of 0.90 to 1.2 wt %, the compression retained stress is in the range of 400 to 700 MPa, the retained austenite amount is in the range of 30 to 40%, the maximum carbide diameter is 0.7 μm or less and the carbide area ratio is 10% or less.

More preferably, the following conditions is satisfied:

$\sigma1 \geq 0.06$μm;

$\sigma1 \leq 0.08$μm; and $(\sigma1^2+\sigma2^2)^{1/2} < 0.10$μm.

According to the second aspect of the invention, similarly to the first aspect of the invention, an oil film can be formed between the aforesaid two sliding portions, and at the same times the wear of the those two sliding portions can be reduced remarkably, whereby the a reduction amount of an assembled width of the vehicle pinion shaft support system can be reduced down to on the order of 50% of that of the conventional system compared thereto.

Consequently, according to the second aspect of the invention, being different from the conventional system, since the pre-load to be applied to the tapered roller bearings at the initial setting of the vehicle pinion shaft support system can be set to a pre-load which realizes an appropriate support rigidity from the beginning, the torque in particular at the initial stage of an operation can be reduced, thereby making it possible to reduce the running costs of the vehicle pinion shaft support system. In addition, the support rigidity of the pinion shaft by the tapered roller bearings can also be maintained at a desirable value over long period of time, whereby the generation of vibration and looseness between the tapered roller bearings and the pinion shaft can be prevented, thereby making it possible to extend the life of the vehicle pinion shaft support system largely.

According to a third aspect of the invention, there is provided a vehicle pinion shaft support system comprising:

a pinion shaft; and a tapered roller bearing which supports the pinion shaft and has an inner race, an outer race and tapered rollers, wherein the inner race has a large rib face having a recessed surface shape on which large-diameter end faces of the tapered rollers slide, and when assuming that the surface roughness of the large-diameter end faces is $\sigma1$ [μmRa] and the surface roughness of the large rib face is $\sigma2$ [μmRa], $\sigma1$ is 0.025 or more and $(\sigma1^2+\sigma2_2)^{1/2}$ is 0.17 [μmRa] or less, wherein a sliding portion of the large-diameter end face of the tapered roller which slides on the large rib face and a sliding portion of the large rib face of the inner race on which the large diameter end face of the tapered roller slides are formed by forming a carbonitride or nitride in a surface portion by carbonitriding or nitriding a high carbon steel material, quenching a substrate of the surface portion from an inside thereof as high carbon or high nitrogen, and thereafter annealing the same at a temperature in the range of 200 to 250° C.

Preferably, the following conditions is preferably satisfied:

$\sigma1 \geq 0.04$μm;

$\sigma1 \leq 0.10$μm;

$(\sigma1^2+\sigma2_2)^{1/2} < 0.12$μm; and annealing the quenched material at a temperature in the range of 220 to 240° C.

According to the third aspect of the invention, similarly to the first aspect of the invention, an oil film can be formed between the aforesaid two sliding portions, and at the same time, the wear of the those two sliding portions can be reduced remarkably, whereby the a reduction amount of an assembled width of the vehicle pinion shaft support system can be reduced down to on the order of 50% of that of the conventional system compared thereto.

Consequently, according to the third aspect of the invention, being different from the conventional system, since the pre-load to be applied to the tapered roller bearings at the initial setting of the vehicle pinion shaft support system can be set to a pre-load which realizes an appropriate support rigidity from the beginning, the torque in particular at the initial stage of an operation can be reduced, thereby making it possible to reduce the running costs of the vehicle pinion shaft support system. In addition, the support rigidity of the pinion shaft by the tapered roller bearings can also be maintained at a desirable value over long period of time, whereby the generation of vibration and looseness between the tapered roller bearings and the pinion shaft can be prevented, thereby making it possible to extend the life of the vehicle pinion shaft support system largely.

According to a fourth aspect of the invention, there is provided a vehicle pinion shaft support system comprising:

a pinion shaft; and a tapered roller bearing which supports the pinion shaft and has an inner race, an outer race and tapered rollers, wherein the inner race has a large rib face having a recessed surface shape on which large-diameter end faces of the tapered rollers slide, and when assuming that the surface roughness of the large-diameter end faces is $\sigma 1$ [μmRa] and the surface roughness of the large rib face is $\sigma 2$ [μmRa], $\sigma 1$ is 0.025 or more and $(\sigma 1^2 + \sigma 2^2)^{1/2}$ is 0.17 [μmRa] or less, wherein a sliding portion of the large-diameter end face of the tapered roller which slides on the large rib face and a sliding portion of the large rib face of the inner race on which the large diameter end face of the tapered roller slides are formed by forming a carbonitride or nitride in a surface portion by carbonitriding or nitriding a high carbon steel material, quenching a substrate of the surface portion from an inside thereof as high carbon or high nitrogen, applying a sub-zero treatment to the substrate so quenched, and thereafter annealing the same at a temperature in the range of 150 to 200° C.

Note that the sub-zero treatment means a treatment in which retained austenite is forcibly transformed into martensite.

Preferably, the following conditions is preferably satisfied:

$\sigma 1 \geq 0.04$ μm;

$\sigma 1 \leq 0.10$ μm;

$(\sigma 1^2 + \sigma 2_2)^{1/2} < 0.12$ μm; and annealing the quenched material at a temperature in the range of 165 to 190° C.

According to the fourth aspect of the invention, similarly to the first aspect of the invention, an oil film can be formed between the aforesaid two sliding portions, and at the same time, the wear of the those two sliding portions can be reduced remarkably, whereby the a reduction amount of an assembled width of the vehicle pinion shaft support system can be reduced down to on the order of 50% of that of the conventional system compared thereto.

Consequently, according to the fourth aspect of the invention, being different from the conventional system, since the pre-load to be applied to the tapered roller bearings at the initial setting of the vehicle pinion shaft support system can be set to a pre-load which realizes an appropriate support rigidity from the beginning, the torque in particular at the initial stage of an operation can be reduced, thereby making it possible to reduce the running costs of the vehicle pinion shaft support system. In addition, the support rigidity of the pinion shaft by the tapered roller bearings can also be maintained at a desirable value over long period of time, whereby the generation of vibration and looseness between the tapered roller bearings and the pinion shaft can be prevented, thereby making it possible to extend the life of the vehicle pinion shaft support system largely.

According the vehicle pinion shaft support system, the oil film can be formed at the sliding portion of the large-diameter end face of the tapered roller which slides on the large rib face of the inner race and the sliding portion of the large rib face of the inner race on which the large-diameter end face of the tapered roller slides, and at the same time, the wear of the those two sliding portions can be reduced remarkably, whereby the a reduction amount of an assembled width of the vehicle pinion shaft support system can be reduced down to on the order of 50% of that of the conventional system compared thereto.

Consequently, since the pre-load to be applied to the tapered roller bearings at the initial setting of the vehicle pinion shaft support system can be set to a lower value than one set in the conventional system, which is a pre-load which realizes an appropriate support rigidity from the beginning, the torque in particular at the initial stage of an operation can be reduced, thereby making it possible to reduce the running costs of the vehicle pinion shaft support system. In addition, the support rigidity of the pinion shaft by the tapered roller bearings can also be maintained at a desirable value over long period of time, whereby the generation of looseness between the tapered roller bearings and the pinion shaft can be prevented, thereby making it possible to extend the life of the vehicle pinion shaft support system remarkably.

BRIEF DESCRIPTION OF THE DRAWINGS

FIG. 3 is a chart which shows results of wear evaluation tests carried out on tapered roller bearings.

DETAILED DESCRIPTION OF PREFERRED EMBODIMENTS

Hereinafter, the invention will be described in detail based on an embodiment thereof.

Figure 1:
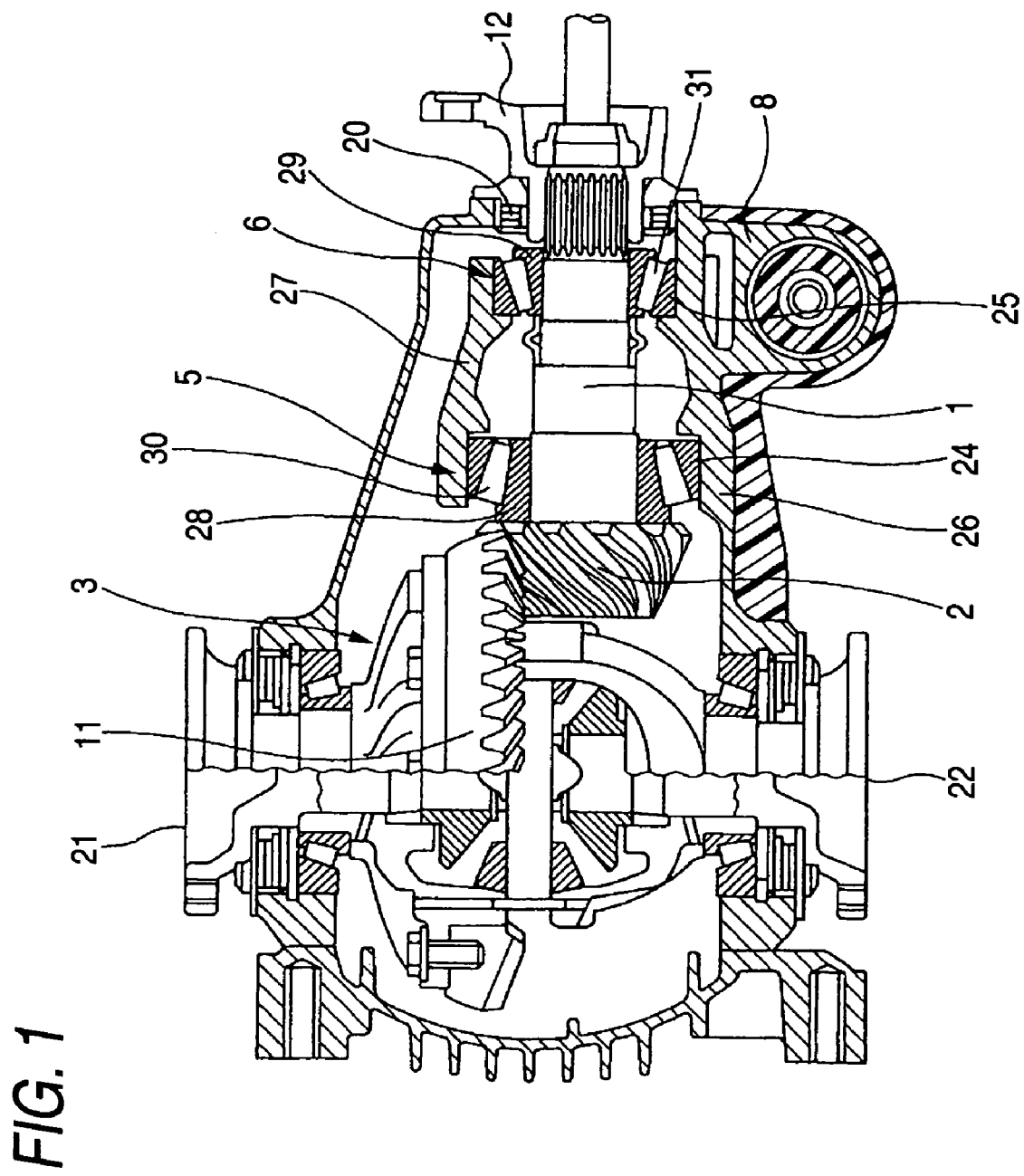
FIG. 1 is a sectional view of a differential gearbox to which an embodiment of a vehicle pinion shaft support system of the invention is applied.

FIG. 1 is a sectional view of a differential gearbox which is an example to which a vehicle pinion shaft support system of the invention is applied.

This differential gearbox includes a pinion shaft 1, a differential mechanism 3, a primary tapered roller bearing 5, which is disposed on an outer circumference of the pinion shaft 1 at an end thereof which lies to a side of the differential mechanism 3, a secondary tapered roller bearing 6, which is disposed on the outer circumference of the pinion shaft 1 at an opposite end to the end thereof which lies to the side of the differential mechanism 3, and a casing 8 which accommodates therein the pinion shaft 1, the differential mechanism 3, the primary tapered roller bearing 5 and the secondary tapered roller bearing 6.

A pinion gear 2 is formed at an end portion of the pinion shaft 1 which lies to the side of the differential mechanism 3, and the pinion gear 2 on the pinion shaft 1 meshes with a ring gear 11 of the differential mechanism 3. On the other hand, a flange joint 12 is disposed at the other end portion of the pinion shaft 1, so that a drive shaft, not shown, can be connected thereto.

The casing 8 includes a main body portion 26 which defines an interior area of the differential gearbox and a substantially cylindrical annular portion 27 which continues to an inner circumferential surface of the main body portion 26 and constitutes an inside portion which is disposed in an interior space of the main body portion 26.

The primary tapered roller bearing 5 includes an inner race 28, an outer race 24 and a plurality of tapered rollers 30, and the secondary tapered roller bearing 6 includes an inner race 29, an outer race 25 and a plurality of tapered rollers 31. An inner circumferential surface of the inner race 28 of the primary tapered roller bearing 5 and an inner circumferential surface of the inner race 29 of the secondary tapered roller bearing 6 are fixed to an outer circumferential surface of the pinion shaft 1, whereas an outer circumferential surface of the outer race 24 of the primary tapered roller bearing 5 and an outer circumferential surface of the outer race 25 of the secondary tapered roller bearing 6 are fixed to an inner circumferential surface of the main body portion 26 of the casing 8 and an inner circumferential surface of the annular portion 27 The primary and secondary tapered roller bearings 5, 6 support the pinion shaft 1 rotatably at a predetermined position.

Note that in FIG. 1, reference numeral 20 denotes a seal member. This seal member 20 prevents the leakage of oil within The differential gearbox according to the embodiment is designed to transmit power of the drive shaft to the differential mechanism 3 via the pinion shaft 1 as to drive the differential mechanism 3. Then, a difference in rotational speed between two axle shafts (not shown) which are connected, respectively, to joints 21 and 22 which are disposed to a side of the differential mechanism 3.

Figure 2:
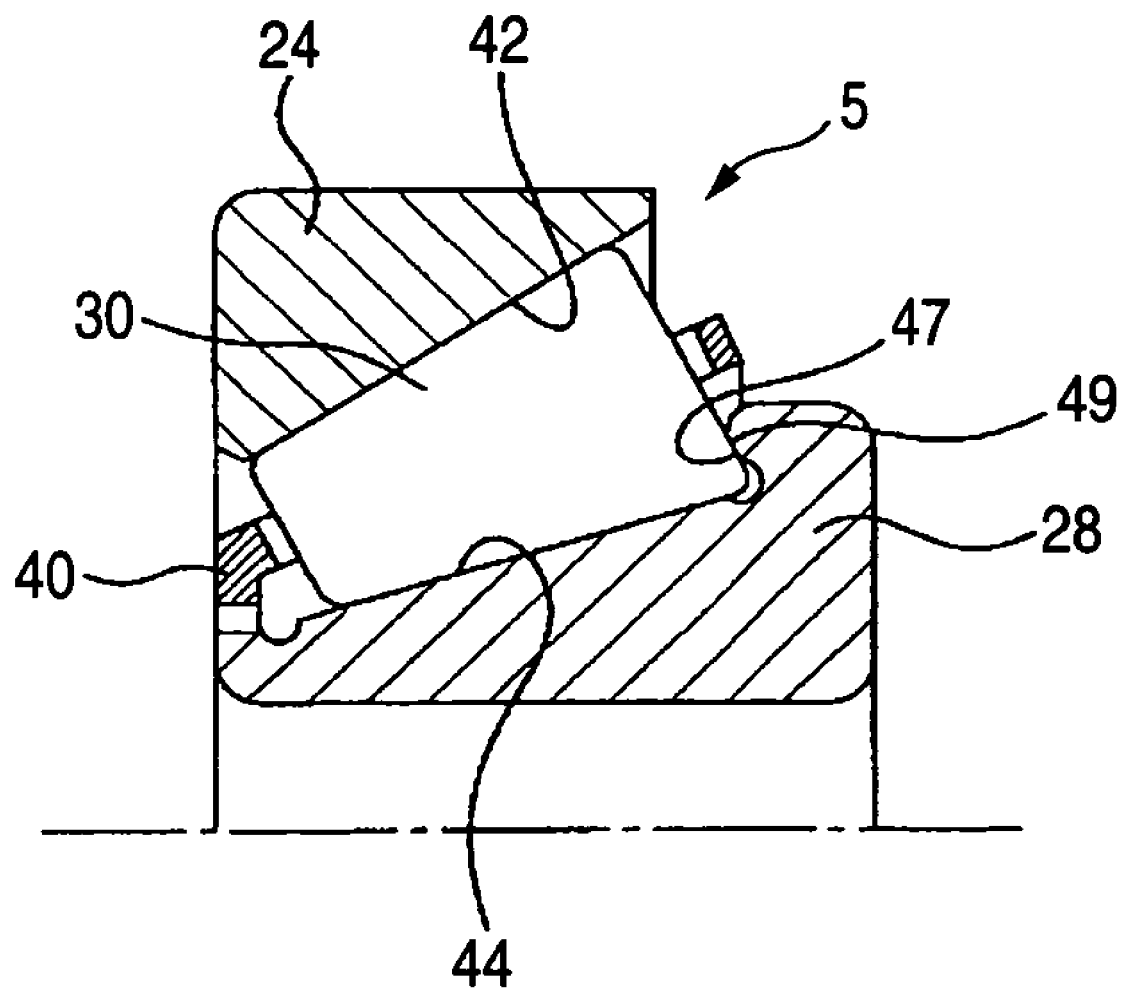
FIG. 2 is an axial sectional view of a primary tapered roller bearing possessed by the differential gearbox according to the invention.

FIG. 2 is an axial sectional view of the primary tapered roller bearing 5.

Hereinafter, details of the primary tapered roller bearing 5 will be described using FIG. 2. Note that while a detailed description of the secondary tapered roller bearing 6 will not be made, it is understood that the secondary tapered roller bearing 6 has the same features as those possessed by the primary tapered roller bearing 5.

As is described above, the primary tapered roller bearing 5 includes the outer race 24, the inner race 28 and the tapered rollers 30. The outer race 24 has a tapered or inclined raceway surface 42 in section on an inner circumferential side thereof.

The inner race 28 has a tapered or inclined raceway 44 in section on an outer circumference thereof. The inner race 28 has a large rib face 47 on which a large-diameter end face 49 of the tapered roller 30 slides at an end portion of the inclined raceway surface 44 which lies on a larger-diameter side.

In addition, the plurality of tapered rollers 30 are disposed in a circumferential direction at constant intervals in such a state that they are retained between the inclined raceway surface 42 of the outer race 24 and the inclined raceway surface 44 of the inner race 28 by a retainer 40.

When assuming the arithmetic mean surface roughness Ra of the large-diameter end face 49 of the tapered roller 30 is $\sigma1$ [μm] and the arithmetic mean surface roughness Ra of the large rib face 47 is $\sigma2$ [μm], al is set to be 0.025 or more and $(\sigma1^2+\sigma2^2)^{1/2}$ is set to be 0.17 [μmRa] or less. This large rib face 47 is formed so as to have a recessed surface shape.

In addition, surfaces of the outer race 24, the inner race 28 and the tapered rollers 30 are made of a carburized steel and are set such that a carbon content in a matrix phase in a surface layer portion to a depth of 50 μm from the surface is 0.8 wt % or more, the surface hardness thereof is in the range of Rockwell C63 to 67, and a surface retained austenite amount is 20% or more and 25% or less.

FIG. 3 is a chart which shows the results of wear evaluation tests carried out on tapered roller bearings.

In FIG. 3, the axis of ordinate denotes the elapse of time, and the axis of abscissa denotes variation in assembled width. In the axis of ordinate, a point 0 denotes a state in which a predetermined assembled width is maintained.

In addition, in FIG. 3, reference numeral 61 denotes a result of a test run on a standard tapered roller bearing which is used in a vehicle pinion shaft support system. To be specific, the standard tapered roller bearing means a tapered roller bearing in which an inner race has a large rib face having a raised surface shape on which large-diameter end faces of tapered rollers slide and the material of the inner race, an outer race and the tapered rollers is a high carbon chrome bearing steel (SUJ2).

Additionally, reference numeral 62 denotes a result of a test carried out on a comparison tapered roller bearing which is used in a vehicle pinion gear support system. To be specific, the comparison tapered roller bearing means a tapered roller bearing in which an inner race has a large rib face having a recessed surface shape on which large-diameter end faces of tapered rollers slide and when assuming the arithmetic mean surface roughness Ra of the large-diameter end face of the tapered roller is $\sigma1$ [μm] and the arithmetic mean surface roughness Ra of the large rib face is $\sigma2$ [μm], $\sigma1$ is set to be 0.025 or more and $(\sigma1^2+\sigma2^2)^{1/2}$ is set to be 0.17 [μmRa] or less. In addition, in the tapered roller bearing, the material of the inner race, an outer race and the tapered rollers is a high carbon chrome bearing steel (SUJ2).

Additionally, reference numeral 63 denotes a result of a test carried out on the tapered roller bearing provided in the vehicle pinion shaft support system of the invention. To be specific, the tapered roller bearing provided in the vehicle pinion shaft support system of the invention is the tapered roller bearing that has already been described above using FIG. 2.

In addition, the following test condition is adopted as a test condition common to the above three tapered roller bearings. Namely, a tapered roller bearing is used in which the axial dimension is 35 mm, the outside diameter of an outer circumferential surface of an outer race is 80 mm, and the inside diameter of an inner circumferential surface of an inner race is 32, 75 mm. In addition, a radial load of 700 kgf, a radial load of 900 kgf and a pre-load of 600 kgf are applied to the bearing. Additionally, the revolving speed of the tapered roller bearing is set to 4000 rpm, and a gear oil rated to SAE 90 under American Automobiles Standards is used. Furthermore, a condition of 0.05 gr/1 is adopted as contamination.

As shown in FIG. 3, in all three cases, the reduction amount of the assembled width increases with passage of time. Then, a rate at which the reduction amount of the assembled width increases, that is, a variation corresponding to the inclination of a curve decreases with passage of time.

In the standard tapered roller bearing whose test result is indicated by 61, the reduction amount of the assembled width reached to 35 μm 20 hours after the test has been started. From this, a pre-load that is set when the standard tapered roller bearing is incorporated in a vehicle pinion shaft support system needs to be get higher in consideration of the reduction amount of the assembled width, whereby at an initial state of an operation, in particular, an increase in torque is called for, resulting in an increase in the running costs of the vehicle pinion shaft support system.

In addition, in the comparison tapered roller bearing, the reduction amount of the assembled width resulting 20 hours after the initiation of the test can be suppressed substantially to 27.5 compared to the standard tapered roller bearing.

Namely, it is seen that the reduction of the assembled width resulting 20 hours after the initiation of the test can be suppressed to on the order of 0.8 or four fifth of the reduction amount of the assembled width of the standard tapered roller bearing. Namely, the loss of pre-load is smaller than the standard tapered roller bearing, and hence, the initial pre-load can be set small, whereby the torque can be reduced. In addition, since the loss of pre-load is small, it is seen that the support rigidity of the pinion shaft is high.

On the other hand, in the tapered roller bearing provided in the differential gearbox of the invention and whose test result is indicated by 63, the reduction amount of the assembled width resulting 20 hours after the initiation of the test is reduced remarkably down to about 16.5. Then, compared to the standard tapered roller bearing, the amount of the assembled width resulting 20 hours after the initiation of the test can be reduced largely by 50% or more. It is seen from this that the tapered roller bearing provided in the differential gearbox of the invention has a superior anti-pre-load-loss performance, as well as a superior capability of maintaining the support rigidity of the pinion shaft at a predetermined value.

From this, in the event that the tapered roller bearing shown in FIG. 2 is set in a vehicle pinion shaft support system, a pre-load that is to be imparted to the tapered roller bearing can be set lower from the beginning. In addition, the torque can be suppressed low from when the vehicle pinion shaft support system is initially used, and the prevention of reduction in the support rigidity of the pinion shaft can be ensured.

According to the differential gearbox of the embodiment, since the inner races 28, 29 of the primary tapered roller bearing 5 and the secondary tapered roller bearing 6 have the large rib faces 47 each having the recessed surface shape on which the large-diameter end faces 49 of the tapered rollers 30, 31 slide and when the surface roughness of the large-diameter end face 49 is $\sigma1$ [μmRa] and the surface roughness of the large rib face 47 is $\sigma2$ [μmRa], $\sigma1$ is 0.025 or more and $(\sigma1^2+\sigma2^2)^{1/2}$ is 0.17 [μmRa] or less, the formation of an oil film between the large-diameter end face 49 and the large rib face 47 is facilitated. Consequently, the value of torque needed to drive the primary and secondary tapered roller bearings 5, 6 can be reduced largely, thereby making it possible to reduce remarkably the running costs of the vehicle pinion shaft support system.

In addition, according to the differential gearbox of the embodiment, the sliding portions of the large-diameter end faces of the tapered rollers 30, 31 of the primary and secondary tapered roller bearings 5, 6 which slide on the large rib faces 47 of the inner races 28, 29 and the sliding portions of the large rib faces 47 of the inner races 28, 29 on which the large diameter end faces of the tapered rollers 30, 31 slide are made of carburized steel, the carbon content in the matrix phase in the surface layer portion of each of the sliding portions to the depth of 50 μm from the surface is 0.8 wt % or more, the surface hardness thereof is in the range of Rockwell C63 to 67, and the surface retained austenite amount is 20% or more and 25% or less, the wear of the sliding portions of the large-diameter end faces 49 of the tapered rollers 30, 31 and the sliding portions of the large rib faces 47 of the inner races 28, 29 can be reduced remarkably.

Consequently, the differential gearbox according to the embodiment is such that in each of the primary and secondary tapered roller bearings 5, 6, the oil film can be formed between the two sliding portions and at the same time, the wear of the two sliding portions can be reduced remarkably, whereby the amount of wear generated between the two sliding portions can be reduced remarkably compared to the conventional system. In addition, the reduction amount of the assembled width of the vehicle pinion gear support system can be reduced largely by 50% or more compared to the conventional system due to the synergetic effect of the aforesaid two effects.

Consequently, according to the differential gearbox of the embodiment, in the initial setting of the differential gearbox, since the pre-load that is applied to the primary and secondary tapered roller bearings 5, 6 can be set lower than in the conventional system and hence, the pre-load can be set to one which realizes an appropriate pinion shaft 1 support rigidity from the beginning, the torque of the primary and secondary tapered roller bearings 5, 6 can be reduced, thereby making it possible to reduce the running costs of the vehicle pinion gear support system. In addition, the support rigidity of the pinion gear 1 by the primary and secondary tapered roller bearings 5, 6 can be maintained at the desired value over a long period of time, and the generation of vibration and looseness between the primary and secondary tapered roller bearings 5, 6 and the pinion shaft 1 can be prevented.

In the differential gearbox of the embodiment, as the material of the sliding portions of the large-diameter end faces of the tapered rollers 30, 31 of the primary and secondary tapered roller bearings 5, 6 which slide on the large rib faces 47 of the inner races 28, 29 and the sliding portions of the large rib faces 47 of the inner races 28, 29 on which the large diameter end faces of the tapered rollers 30, 31 slide, the material made of the carburized steel is adopted in which the carbon content in the matrix phase in the surface layer portion of each of the sliding portions to the depth of 50 μm from the surface is 0.8 wt % or more, the surface hardness thereof is in the range of Rockwell C63 to 67, and the surface retained austenite amount is 20 or more and 25% or less.

However, the inventor has verified that substantially the same function and advantage as those provided by the embodiment can be acquired even in the event that materials having characteristics described under (1) to (3) below (all the characteristic are to be satisfied) are used in place of the aforesaid material as the material of the sliding portions of the large rib faces of the inner races of the primary and secondary tapered roller bearings on which the large-diameter end faces of the tapered rollers thereof slide and the sliding portions of the large-diameter end faces of the tapered rollers which slides on the large rib faces of the inner races thereof.

(1) A material that is formed by a heat treatment including a carburizing treatment to a steel material including 0.15 to 0.3 wt % carbon. (2) A material in which at a portion 0 to 50 μm deep from the topmost surface as a base, the carbon content is in the range of 1.0 to 1.5 wt %, Rockwell hardness in scale C is in the range of 64 to 66, the compression retained stress is in the range of 150 to 2000 MPa, the maximum carbide diameter is 3 μm or less, and the carbide area ratio is in the range of 10 to 25%. (3) when assuming that the effective hardened layer depth is a [μm], at a portion 50 to a/5 μm deep, the carbon content is in the range of 0.75 to 1.3 wt %, the compression retained stress is in the range of 150 to 1000 MPa, the amount of retained austenite is in the range of 25 to 45%, the maximum carbide diameter is 1 μm or less, and the carbide area ratio is in the range of 15% or less.

In addition, the inventor has also verified that substantially the same function and advantage as those provided by the embodiment can be acquired even in the event that a material having characteristics described under (4) is used in place of the aforesaid material as the material of the sliding portions of the large rib faces of the inner races of the primary and secondary tapered roller bearings on which the large-diameter end faces of the tapered rollers thereof slide and the sliding portions of the large-diameter end faces of the tapered rollers which slides on the large rib faces of the inner races thereof.

(4) A material that is formed by forming a carbonitride or nitride in a surface portion by carbonitriding or nitriding a high carbon steel material, quenching a substrate of the surface portion from an inside thereof as high carbon or high nitrogen, and thereafter annealing the same at a temperature in the range of 200 to 250° C.

Additionally, the inventor has also verified that substantially the same function and advantage as those provided by the embodiment can be acquired even in the event that a material having characteristics described under (5) is used in place of the aforesaid material as the material of the sliding portions of the large rib faces of the inner races of the primary and secondary tapered roller bearings on which the large-diameter end faces of the tapered rollers thereof slide and the sliding portions of the large-diameter end faces of the tapered rollers which slides on the large rib faces of the inner races thereof.

(5) A material that is formed by forming a carbonitride or nitride in a surface portion by carbonitriding or nitriding a high carbon steel material, quenching a substrate of the surface portion from an inside thereof as high carbon or high nitrogen, applying a sub-zero treatment to the substrate so quenched, and thereafter annealing the same at a temperature in the range of 150 to 200° C.

Note that in the embodiment, the primary tapered roller bearing 5 and the secondary tapered roller bearing 6 are installed in the differential gearbox which are characterized in that the inner races 28, 29 have the large rib faces 47 each having the recessed surface shape on which the large-diameter end faces 49 of the tapered rollers 30, 31 slide and when the surface roughness of the large-diameter end face 49 is σ1 [μmRa] and the surface roughness of the large rib face 47 is σ2 [μmRa], σ1 is 0.025 or more and $(\sigma 1^2+\sigma 2^2)^{1/2}$ is 0.17 [μmRa] or less. However, the primary tapered roller bearing and the secondary tapered roller bearing may of course be installed in a transaxle which are characterized, according to the invention, in that the inner races have the large rib faces each having the recessed surface shape on which the large-diameter end faces of the tapered rollers slide and when the surface roughness of the large-diameter end face is σ1 [μmRa] and the surface roughness of the large rib face is σ2 [μmRa], σ1 is 0.025 or more and $(\sigma 1^2+\sigma 2^2)^{1/2}$ is 0.17 [μmRa] or less. In addition, in this case, it is needless to say that the transaxle has the same function and advantage as those possessed by the differential gearbox.

What is claimed is:

1. A vehicle pinion shaft support system comprising:
   a pinion shaft; and
   a tapered roller bearing which supports the pinion shaft and has an inner race, an outer race, and tapered rollers,
   wherein the inner race has a large rib face having a recessed surface shape on which large-diameter end faces of the tapered rollers slide, such that, when a surface roughness of the large-diameter end faces is $\sigma_1$ μmRa and a surface roughness of the large rib face is $\sigma_2$ μmRa, $\sigma_1 \geq 0.025$ μmRa and $(\sigma_1^2+\sigma_2^2)^{1/2} \leq 0.17$ μmRa,
   wherein sliding portions of the large-diameter end faces of the tapered rollers which slide on the large rib face and a sliding portion of the large rib face of the inner race on which the large-diameter end faces of the tapered rollers slide comprise carburized steel, and
   wherein the sliding portions are set such that a carbon content in a matrix phase in a surface layer portion of each of the sliding portions from a depth of 50 μm to a surface thereof is 0.8 wt % or more, and a surface retained austenite amount is in a range of 20% to 25%.

2. The vehicle pinion shaft support system according to claim 1, wherein said inner race comprises an inner circumferential surface which is fixed to an outer circumferential surface of the pinion shaft.

3. The vehicle pinion shaft support system according to claim 1, wherein said outer race comprises an outer circumferential surface which is fixed to an inner circumferential surface of a main body portion of a casing of a differential gearbox and an inner circumferential surface of an annular portion of the casing of the differential gearbox.

4. The vehicle pinion shaft support system according to claim 1, wherein said outer race comprises one of a tapered raceway and an inclined raceway in section on an inner circumferential side of said outer race; and
   wherein said inner race comprises one of a tapered raceway and an inclined raceway in section on an outer circumferential side of said inner race.

5. The vehicle pinion shaft support system according to claim 4, wherein said tapered rollers are disposed in a circumferential direction at constant intervals such that said tapered rollers are retained between said raceway of said outer race and said raceway of inner race by a retainer.

6. A vehicle pinion shaft support system comprising:
   a pinion shaft; and
   a tapered roller bearing which supports the pinion shaft and has an inner race, an outer race, and tapered rollers,
   wherein the inner race has a large rib face having a recessed surface shape on which large-diameter end faces of the tapered rollers slide such that, when a surface roughness of the large-diameter end faces is $\sigma_1$ μmRa and a surface roughness of the large rib face is $\sigma_2$ [μmRa], $\sigma_1 \geq 0.025$ μmRa and $(\sigma_1^2+\sigma_2^2)^{1/2} \leq 0.17$ μmRa,
   wherein sliding portions of the large-diameter end faces of the tapered rollers which slide on the large rib face and a sliding portion of the large rib face of the inner race on which the large-diameter end faces of the tapered roller slide comprise a heat-treated carburized to a steel material including 0.15 to 0.3 wt % carbon,
   wherein a first portion of each of the sliding portions from a depth of 50 μm to a topmost surface thereof as a base is set such that a carbon content in said first portion is in a range of 1.0 to 1.5 wt %, a compression retained stress is in a range of 150 to 2000 MPa, a maximum carbide diameter is 3 μm or less, and a carbide area ratio is in the range of 10 to 25%, and
   wherein a second portion of each of the sliding portions from a depth of 50 μm to a/5 μm, where a is an effective hardened layer depth, is set such that a carbon content is in a range of 0.75 to 1.3 wt %, a compression retained stress is in a range of 150 to 1000 MPa, a retained austenite amount is in range of 25 to 45%, a maximum carbide diameter is 1 μm or less, and a carbide area ratio is 15% or less.

7. The vehicle pinion shaft support system according to claim 6, wherein said inner race comprises an inner circumferential surface which is fixed to an outer circumferential surface of the pinion shaft.

8. The vehicle pinion shaft support system according to claim 6, wherein said outer race comprises an outer circumferential surface which is fixed to an inner circumferential surface of a main body portion of a casing of a differential gearbox and an inner circumferential surface of an annular portion of the casing of the differential gearbox.

9. The vehicle pinion shaft support system according to claim 6, wherein said outer race comprises one of a tapered raceway and an inclined raceway in section on an inner circumferential side of said outer race; and wherein said inner race comprises one of a tapered raceway and an inclined raceway in section on an outer circumferential side of said inner race.

10. The vehicle pinion shaft support system according to claim 9, wherein said tapered rollers are disposed in a circumferential direction at constant intervals such that said tapered rollers are retained between said raceway of said outer race and said raceway of inner race by a retainer.

11. A vehicle pinion shaft support system comprising:
a pinion shaft; and
a tapered roller bearing which supports the pinion shaft and has an inner race, an outer race, and tapered rollers,
wherein the inner race has a large rib face having a recessed surface shape on which large-diameter end faces of the tapered rollers slide such that, when a surface roughness of the large-diameter end faces is $\sigma_1$ μmRa and a surface roughness of the large rib face is $\sigma_2$ μmRa, $\sigma_1 \geq 0.025$ μmRa and $(\sigma_1^2+\sigma_2^2)^{1/2} \leq 0.17$ μmRa, and
wherein sliding portions of the large-diameter end faces of the tapered rollers which slide on the large rib face and a sliding portion of the large rib face of the inner race on which the large-diameter end faces of the tapered rollers slide comprise one of a carbonitride and a nitride in a surface portion, said carbonitride comprising:
a carbonitrided high carbon steel material; and
a substrate of the surface portion, said substrate of the surface portion being quenched from an inside thereof as high carbon and annealed at a temperature in a range of 200 to 250° C.; and said nitride comprising:
a nitrided high carbon steel material; and
a substrate of the surface portion, an inside of said substrate of the surface portion being quenched as high nitrogen and annealed at a temperature in a range of 200 to 250° C.

12. The vehicle pinion shaft support system according to claim 11, wherein said inner race comprises an inner circumferential surface which is fixed to an outer circumferential surface of the pinion shaft.

13. The vehicle pinion shaft support system according to claim 11, wherein said outer race comprises an outer circumferential surface which is fixed to an inner circumferential surface of a main body portion of a casing of a differential gearbox and an inner circumferential surface of an annular portion of the casing of the differential gearbox.

14. The vehicle pinion shaft support system according to claim 11, wherein said outer race comprises one of a tapered raceway and an inclined raceway in section on an inner circumferential side of said outer race; and wherein said inner race comprises one of a tapered raceway and an inclined raceway in section on an outer circumferential side of said inner race.

15. The vehicle pinion shaft support system according to claim 14, wherein said tapered rollers are disposed in a circumferential direction at constant intervals such that said tapered rollers are retained between said raceway of said outer race and said raceway of inner race by a retainer.

16. A vehicle pinion shaft support system comprising:
a pinion shaft; and
a tapered roller bearing which supports the pinion shaft and has an inner race, an outer race, and tapered rollers,
wherein the inner race has a large rib face having a recessed surface shape on which large-diameter end faces of the tapered rollers slide such that, when a surface roughness of the large-diameter end faces is $\sigma_1$ μmRa and a surface roughness of the large rib face is $\sigma_2$ μmRa, $\sigma_1 \geq 0.025$ μmRa and $(\sigma_1^2+\sigma_2^2)^{1/2} \leq 0.17$ μmRa,
wherein sliding portions of the large-diameter end faces of the tapered rollers which slide on the large rib face and a sliding portion of the large rib face of the inner race on which the large-diameter end faces of the tapered rollers slide comprise one of a carbonitride and a nitride in a surface portion, said carbonitride comprising:
a carbonitrided high carbon steel material; and
a substrate of the surface portion, said substrate of the surface portion being quenched from an inside thereof as high carbon, treated with a sub-zero treatment, and annealed at a temperature in a range of 150 to 200° C.; and said nitride comprising:
a nitrided high carbon steel material; and
a substrate of the surface portion, said substrate of the surface portion quenched as high nitrogen, treated with a sub-zero treatment, and annealed at a temperature in a range of 150 to 200° C.

17. The vehicle pinion shaft support system according to claim 16, wherein said inner race comprises an inner circumferential surface which is fixed to an outer circumferential surface of the pinion shaft.

18. The vehicle pinion shaft support system according to claim 16, wherein said outer race comprises an outer circumferential surface which is fixed to an inner circumferential surface of a main body portion of a casing of a differential gearbox and an inner circumferential surface of an annular portion of the casing of the differential gearbox.

19. The vehicle pinion shaft support system according to claim 16, wherein said outer race comprises one of a tapered raceway and an inclined raceway in section on an inner circumferential side of said outer race; and wherein said inner race comprises one of a tapered raceway and an inclined raceway in section on an outer circumferential side of said inner race.

20. The vehicle pinion shaft support system according to claim 19, wherein said tapered rollers are disposed in a circumferential direction at constant intervals such that said tapered rollers are retained between said raceway of said outer race and said raceway of inner race by a retainer.

* * * * *